United States Patent
Rollet et al.

(10) Patent No.: US 10,728,962 B2
(45) Date of Patent: Jul. 28, 2020

(54) RF OVEN ENERGY APPLICATION CONTROL

(71) Applicant: ILLINOIS TOOL WORKS, INC., Glenview, IL (US)

(72) Inventors: Christine Rollet, Evanston, IL (US); Sheena Madden, Chicago, IL (US); Andrea Baccara, Chicago, IL (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 263 days.

(21) Appl. No.: 15/810,550

(22) Filed: Nov. 13, 2017

(65) Prior Publication Data
US 2018/0152999 A1 May 31, 2018

Related U.S. Application Data

(60) Provisional application No. 62/427,995, filed on Nov. 30, 2016.

(51) Int. Cl.
*H05B 6/68* (2006.01)
*H05B 6/70* (2006.01)
(Continued)

(52) U.S. Cl.
CPC .............. *H05B 6/68* (2013.01); *H05B 6/645* (2013.01); *H05B 6/6435* (2013.01);
(Continued)

(58) Field of Classification Search
USPC ....... 219/678, 679, 681, 687, 690, 716, 717, 219/725, 726, 756
See application file for complete search history.

(56) References Cited

U.S. PATENT DOCUMENTS

| | | | | |
|---|---|---|---|---|
| 6,005,229 A | * | 12/1999 | Brown | H05B 6/6476 219/483 |
| 6,867,399 B2 | * | 3/2005 | Muegge | H05B 6/6485 219/681 |
| 6,987,252 B2 | * | 1/2006 | Graves | H05B 6/6473 126/21 A |

FOREIGN PATENT DOCUMENTS

| | | |
|---|---|---|
| EP | 2051564 A1 | 4/2009 |
| EP | 2434837 A1 | 3/2012 |

(Continued)

OTHER PUBLICATIONS

International Search Report and Written Opinion from corresponding International Application No. PCT/US2017/062493 dated Feb. 15, 2018, all enclosed pages cited.

*Primary Examiner* — David J Walczak
(74) *Attorney, Agent, or Firm* — Burr & Forman, LLP

(57) ABSTRACT

An oven may include a cooking chamber configured to receive a food product, a convective heating system configured to provide heated air into the cooking chamber, a radio frequency (RF) heating system configured to provide RF energy into the cooking chamber using solid state electronic components, and control electronics configured to control the convective heating system and the RF heating system. The control electronics may further control a user interface configured to define one or more control consoles for providing user inputs to control operation of the oven. The control electronics are configured to enable user selection of a cooking time and a selected RF cooking power, but automatic selection of frequency and phase parameters for application of the RF energy responsive to a learning process.

20 Claims, 9 Drawing Sheets

(51) Int. Cl.
*H05B 6/64* (2006.01)
*H05B 6/66* (2006.01)
(52) U.S. Cl.
CPC ......... *H05B 6/6447* (2013.01); *H05B 6/6473* (2013.01); *H05B 6/668* (2013.01); *H05B 6/686* (2013.01); *H05B 6/705* (2013.01); *Y02B 40/146* (2013.01)

(56) References Cited

FOREIGN PATENT DOCUMENTS

WO    2011058537 A1    5/2011
WO    2013033330 A2    3/2013

* cited by examiner

RF OVEN ENERGY APPLICATION CONTROL

CROSS REFERENCE TO RELATED APPLICATIONS

This application claims priority to U.S. application Ser. No. 62/427,995 filed Nov. 30, 2016, the entire contents of which are hereby incorporated by reference in its entirety.

TECHNICAL FIELD

Example embodiments generally relate to ovens and, more particularly, relate to an oven that is enabled to cook food with the application of radio frequency (RF) energy that is generated by solid state components.

BACKGROUND

Combination ovens that are capable of cooking using more than one heating source (e.g., convection, steam, microwave, etc.) have been in use for decades. Each cooking source comes with its own distinct set of characteristics. Thus, a combination oven can typically leverage the advantages of each different cooking source to attempt to provide a cooking process that is improved in terms of time and/or quality.

In some cases, microwave cooking may be faster than convection or other types of cooking. Thus, microwave cooking may be employed to speed up the cooking process. However, a microwave typically cannot be used to cook some foods and also cannot brown foods. Given that browning may add certain desirable characteristics in relation to taste and appearance, it may be necessary to employ another cooking method in addition to microwave cooking in order to achieve browning. In some cases, the application of heat for purposes of browning may involve the use of heated airflow provided within the oven cavity to deliver heat to a surface of the food product.

However, even by employing a combination of microwave and hot airflow, the limitations of conventional microwave cooking relative to penetration of the food product may still render the combination less than ideal. Moreover, a typical microwave is somewhat indiscriminate or uncontrollable in the way it applies energy to the food product. Thus, it may be desirable to provide further improvements to the ability of an operator to achieve a superior cooking result in a relatively short time by improving the efficiency of the delivery of energy to the food product. Providing an oven with improved capabilities relative to cooking food with a combination of controllable RF energy and convection energy may also enable unique opportunities for control of and interface with the oven.

BRIEF SUMMARY OF SOME EXAMPLES

Some example embodiments may therefore provide improved mechanisms for control and interface with an oven that employs RF energy application to at least partially cook food disposed in an oven cavity. The oven may be configured to enable not only unique mechanisms for providing an improved cooking result, but the user experience may also be enhanced by a more intuitive and informative user interface.

In an example embodiment, an oven is provided. The oven may include a cooking chamber configured to receive a food product, a convective heating system configured to provide heated air into the cooking chamber, a radio frequency (RF) heating system configured to provide RF energy into the cooking chamber using solid state electronic components, and control electronics configured to control the convective heating system and the RF heating system. The control electronics may further control a user interface configured to define one or more control consoles for providing user inputs to control operation of the oven. The control electronics are configured to enable user selection of a cooking time and a selected RF cooking power, but automatic selection of frequency and phase parameters for application of the RF energy responsive to a learning process.

In an example embodiment, control electronics may be provided. The control electronics may include a user interface. The control electronics may be configured to control an RF heating system configured to provide RF energy into a cooking chamber of an oven using solid state electronic components. The control electronics may be configured to define one or more control consoles for providing user inputs to control operation of the oven. The control electronics may be configured to enable user selection of a cooking time and a selected RF cooking power, but automatic selection of frequency and phase parameters for application of the RF energy responsive to a learning process.

Some example embodiments may improve the cooking performance and/or improve the operator experience when cooking with an oven employing an example embodiment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 8:
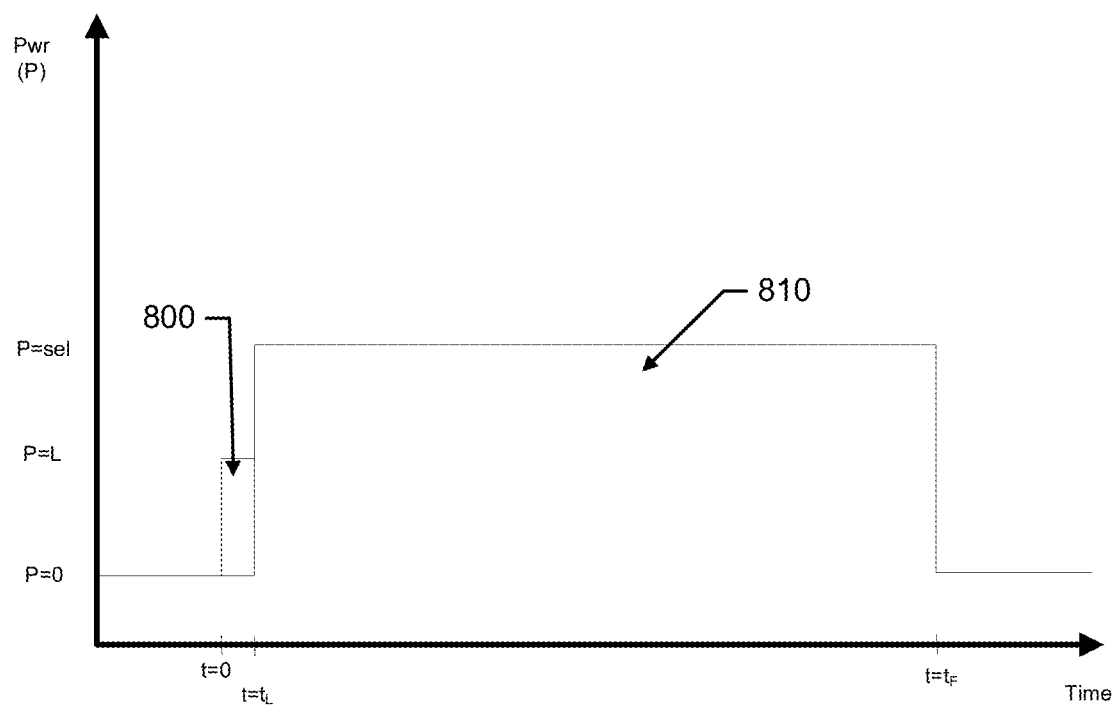
Figure 9:
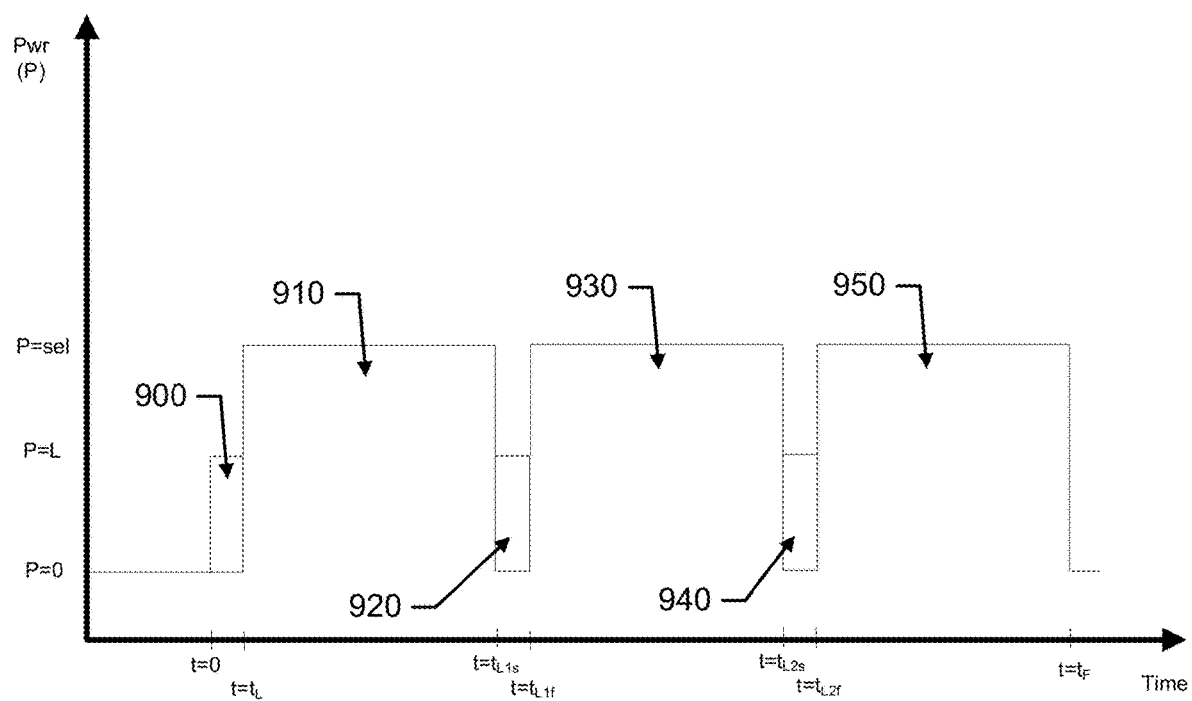

FIG. 8. illustrates a plot of power versus time for a learning process in accordance with an example embodiment; and FIG. 9 illustrates a plot of power versus time for a learning process repeated several times with corresponding cooking processes based thereon in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. Furthermore, as used herein the term "browning" should be understood to refer to the Maillard reaction or other desirable food coloration reactions whereby the food product is turned brown via enzymatic or non-enzymatic processes.

Some example embodiments may improve the cooking performance of an oven and/or may improve the operator experience of individuals employing an example embodiment. In this regard, the oven may cook, at least in part, using solid state components for control of the application of RF energy. Various unique options for control of the RF energy application and for interaction with the oven generally, may then be provided.

Figure 1:
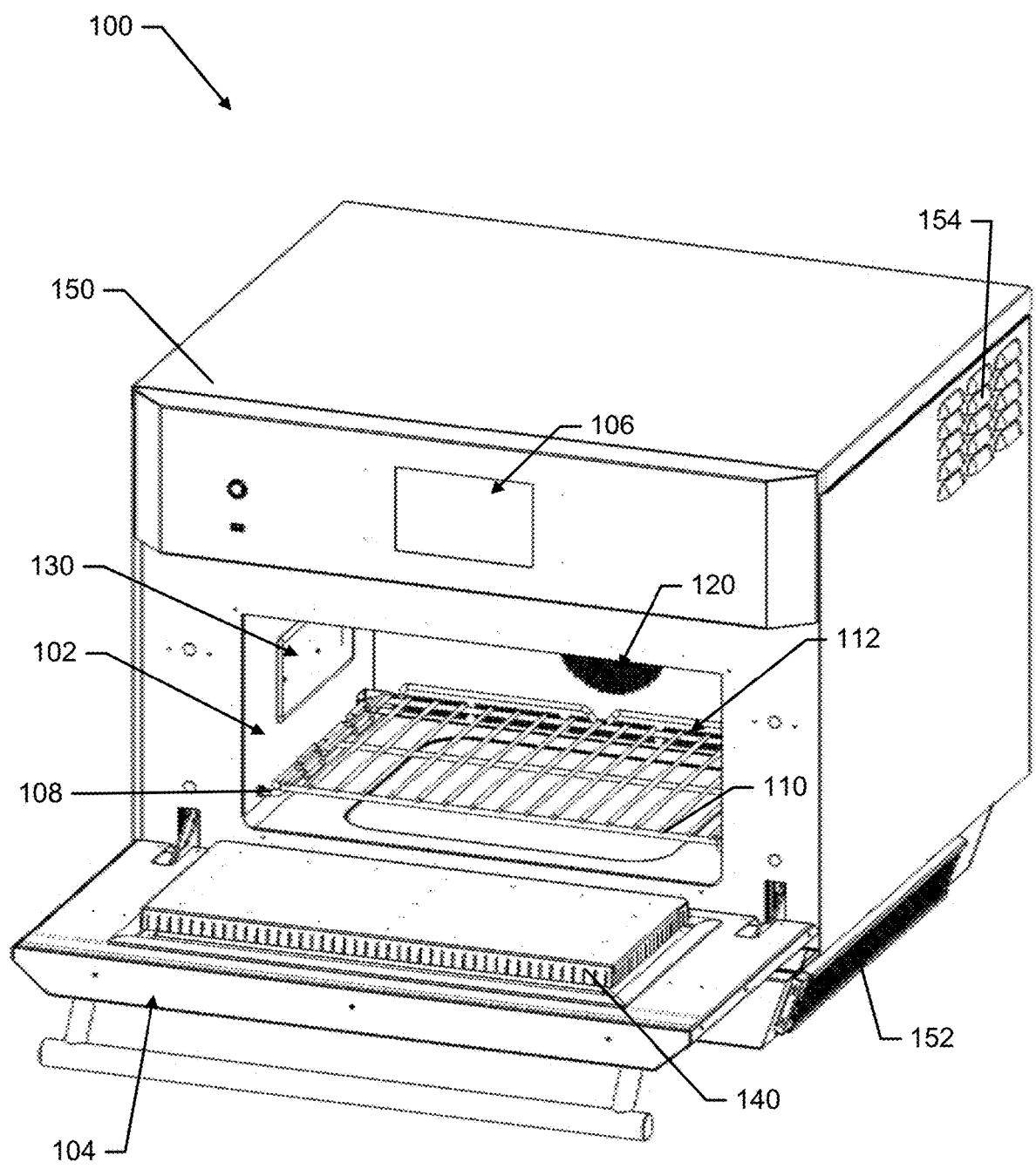
FIG. 1 illustrates a perspective view of an oven capable of employing at least two energy sources according to an example embodiment.

FIG. 1 illustrates a perspective view of an oven 100 according to an example embodiment. As shown in FIG. 1, the oven 100 may include a cooking chamber 102 into which a food product may be placed for the application of heat by any of at least two energy sources that may be employed by the oven 100. The cooking chamber 102 may include a door 104 and an interface panel 106, which may sit proximate to the door 104 when the door 104 is closed. In this regard, for example, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be the mechanism by which instructions are provided to the operator, and the mechanism by which feedback is provided to the operator regarding cooking process status, options and/or the like.

In some embodiments, the oven 100 may include multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting therebetween, may form a first air circulation system within the oven 100.

Food product placed on a pan or one of the racks 110 (or simply on a base of the cooking chamber 102 in embodiments where racks 110 are not employed) may be heated at least partially using radio frequency (RF) energy. Meanwhile, the airflow that may be provided may be heated to enable further heating or even browning to be accomplished. Of note, a metallic pan may be placed on one of the rack supports 108 or racks 110 of some example embodiments. However, the oven 100 may be configured to employ frequencies and/or mitigation strategies for detecting and/or preventing any arcing that might otherwise be generated by using RF energy with metallic components.

In an example embodiment, the RF energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide and/or the like that are configured to couple RF energy into the cooking chamber 102.

The cooking chamber 102 may be configured to provide RF shielding on five sides thereof (e.g., the top, bottom, back, and right and left sides), but the door 104 may include a choke 140 to provide RF shielding for the front side. The choke 140 may therefore be configured to fit closely with the opening defined at the front side of the cooking chamber 102 to prevent leakage of RF energy out of the cooking chamber 102 when the door 104 is shut and RF energy is being applied into the cooking chamber 102 via the antenna assembly 130.

The antenna assembly 130 may be configured to generate controllable RF emissions into the cooking chamber 102 using solid state components. Thus, the oven 100 may not employ any magnetrons, but instead use only solid state components for the generation and control of the RF energy applied into the cooking chamber 102. The use of solid state components may provide distinct advantages in terms of allowing the characteristics (e.g., power/energy level, phase and frequency) of the RF energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system.

The second air circulation system may operate within an oven body 150 of the oven 100 to circulate cooling air for preventing overheating of the solid state components that power and control the application of RF energy to the cooking chamber 102. The second air circulation system may include an inlet array 152 that is formed at a bottom (or basement) portion of the oven body 150. In particular, the basement region of the oven body 150 may be a hollow cavity within the oven body 150 that is disposed below the cooking chamber 102. The inlet array 152 may include multiple inlet ports that are disposed on each opposing side of the oven body 150 proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan) through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. As such, air drawn into the inlet array 152 can reliably be expected to be air at ambient room temperature, and not recycled, expelled cooling air.

Figure 2:
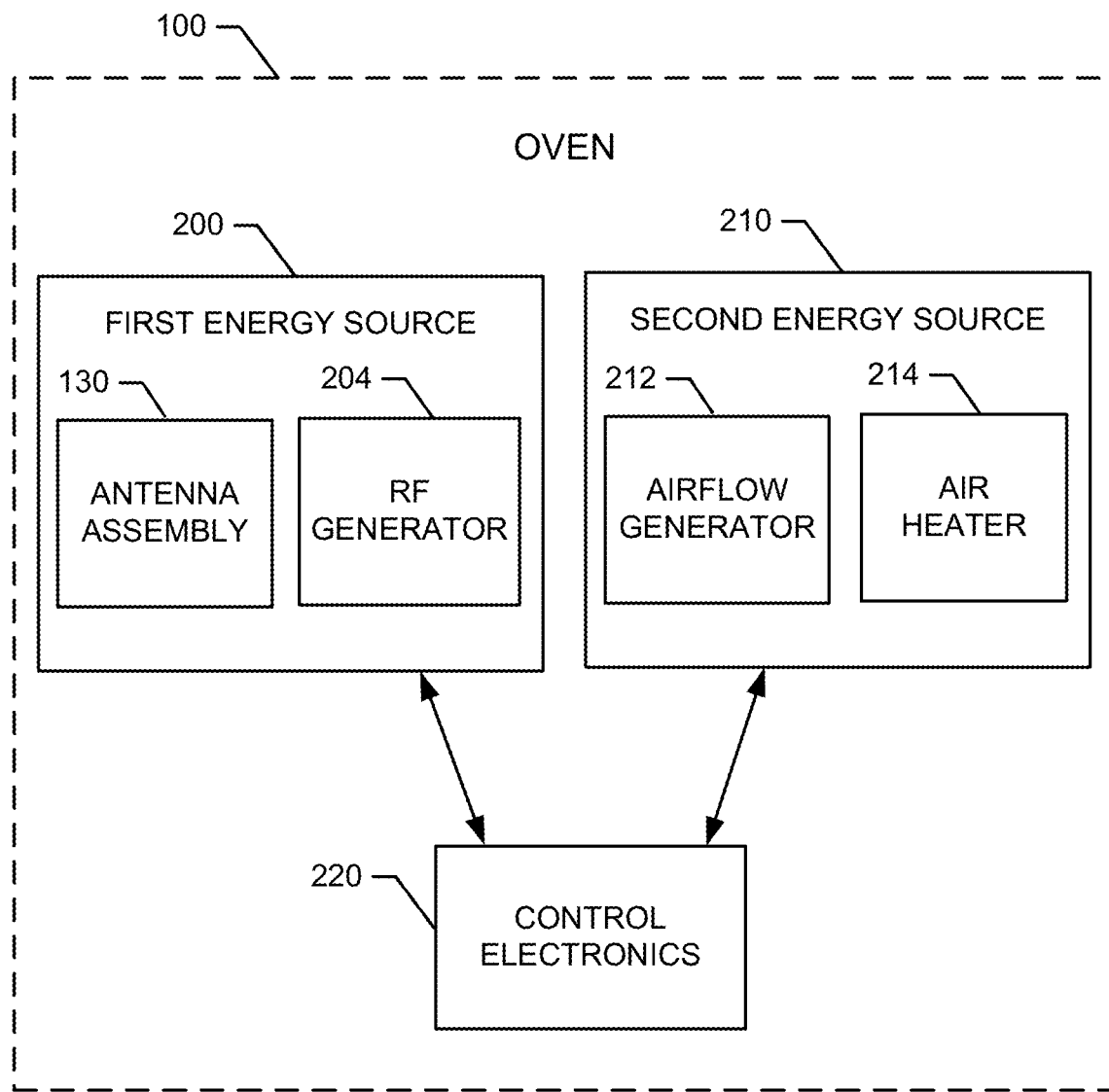
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and a second energy source 210. The first and second energy sources 200 and 210 may each correspond to respective different cooking methods. In some embodiments, the first and second energy sources 200 and 210 may be an RF heating source and a convective heating source, respectively. However, it should be appreciated that additional or alternative energy sources may also be provided in some embodiments.

As mentioned above, the first energy source 200 may be an RF energy source (or RF heating source) configured to generate relatively broad spectrum RF energy or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from the ISM bands for application by the RF generator 204.

In some cases, the antenna assembly 130 may be configured to transmit the RF energy into the cooking chamber 102 and receive feedback to indicate absorption levels of respective different frequencies in the food product. The absorption levels may then be used to control the generation of RF energy to provide balanced cooking of the food product. Feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, the second energy source 210 may be an energy source capable of inducing browning and/or convective heating of the food product. Thus, for example, the second energy source 210 may a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102. In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like.

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking. However, other energy sources (e.g., tertiary or other energy sources) may also be employed in the cooking process.

In some cases, cooking signatures, programs or recipes may be provided to define the cooking parameters to be employed for each of multiple potential cooking stages or steps that may be defined for the food product and the control electronics 220 may be configured to access and/or execute the cooking signatures, programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the cooking signatures, programs or recipes.

Figure 3:
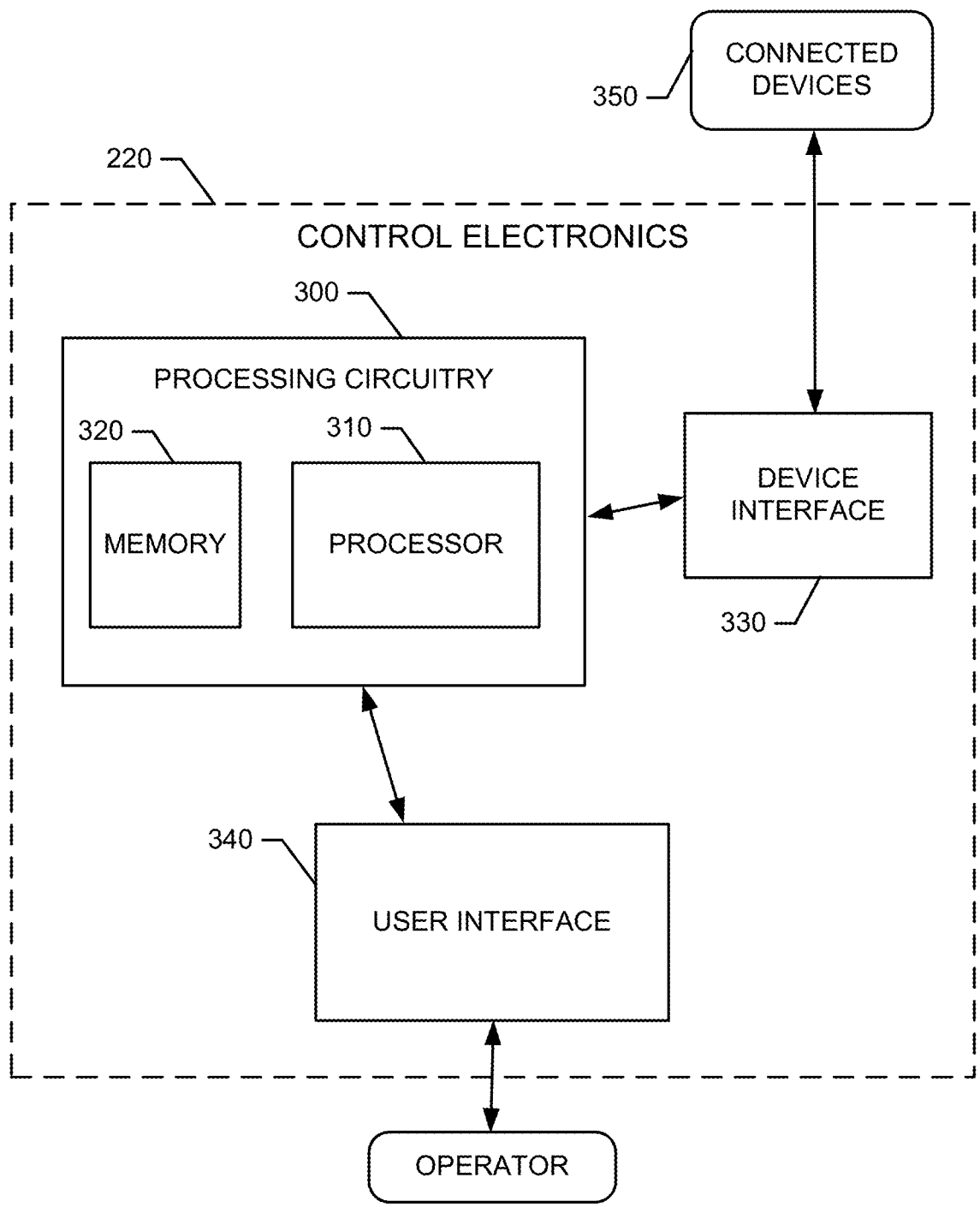
FIG. 3 illustrates a block diagram of control electronics according to an example embodiment.

FIG. 3 illustrates a block diagram of the control electronics 220 according to an example embodiment. In some embodiments, the control electronics 220 may include or otherwise be in communication with processing circuitry 300 that is configurable to perform actions in accordance with example embodiments described herein. As such, for example, the functions attributable to the control electronics 320 may be carried out by the processing circuitry 300.

The processing circuitry 300 may be configured to perform data processing, control function execution and/or other processing and management services according to an example embodiment of the present invention. In some embodiments, the processing circuitry 300 may be embodied as a chip or chip set. In other words, the processing circuitry 300 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 300 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 300 may include one or more instances of each of a processor 310 and memory 320 that may be in communication with or otherwise control a device interface 330 and a user interface 340. As such, the processing circuitry 300 may be embodied as a circuit chip (e.g., an integrated circuit chip) configured (e.g., with hardware, software or a combination of hardware and software) to perform operations described herein. However, in some embodiments, the processing circuitry 300 may be embodied as a portion of an on-board computer.

The user interface 340 (which may be embodied as, include, or be a portion of the interface panel 106) may be in communication with the processing circuitry 300 to receive an indication of a user input at the user interface 340 and/or to provide an audible, visual, mechanical or other output to the user (or operator). As such, the user interface 340 may include, for example, a display (e.g., a touch screen such as the interface panel 106), one or more hard or soft buttons or keys, and/or other input/output mechanisms.

The device interface 330 may include one or more interface mechanisms for enabling communication with connected devices 350 such as, for example, other components of the oven 100, sensors of a sensor network of the oven 100, removable memory devices, wireless or wired network communication devices, and/or the like. In some cases, the device interface 330 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 330 may receive input at least from a temperature sensor that measures the air temperature of air heated (e.g., by air heater 214) prior to introduction of such air (e.g., by the airflow generator 212) into the cooking chamber 102. Alternatively or additionally, the device interface 330 may provide interface mechanisms for any devices capable of wired or wireless communication with the processing circuitry 300. In still other alternatives, the device interface 330 may provide connections and/or interface mechanisms to enable the processing circuitry 300 to control the cool-air circulating fan, the RF generator 204 or other components of the oven 100.

In an exemplary embodiment, the memory 320 may include one or more non-transitory memory devices such as, for example, volatile and/or non-volatile memory that may be either fixed or removable. The memory 320 may be configured to store information, data, cooking signatures, programs, recipes, applications, instructions or the like for enabling the control electronics 220 to carry out various functions in accordance with example embodiments of the present invention. For example, the memory 320 could be configured to buffer input data for processing by the processor 310. Additionally or alternatively, the memory 320 could be configured to store instructions for execution by the processor 310. As yet another alternative, the memory 320 may include one or more databases that may store a variety of data sets responsive to input from the sensor network, or responsive to programming of any of various cooking programs. Among the contents of the memory 320, applications may be stored for execution by the processor 310 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 310 and stored in memory 320 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results.

The processor 310 may be embodied in a number of different ways. For example, the processor 310 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 310 may be configured to execute instructions stored in the memory 320 or otherwise accessible to the processor 310. As such, whether configured by hardware or by a combination of hardware and software, the processor 310 may represent an entity (e.g., physically embodied in circuitry—such as in the form of processing circuitry 300) capable of performing operations according to example embodiments of the present invention while configured accordingly. Thus, for example, when the processor 310 is embodied as an ASIC, FPGA or the like, the processor 310 may be specifically configured hardware for conducting the operations described herein. Alternatively, as another example, when the processor 310 is embodied as an executor of software instructions, the instructions may specifically configure the processor 310 to perform the operations described herein.

In an example embodiment, the processor 310 (or the processing circuitry 300) may be embodied as, include or otherwise control the control electronics 220. As such, in some embodiments, the processor 310 (or the processing circuitry 300) may be said to cause each of the operations described in connection with the control electronics 220 by directing the control electronics 220 to undertake the corresponding functionalities responsive to execution of instructions or algorithms configuring the processor 310 (or processing circuitry 300) accordingly. As an example, the control electronics 220 may be configured to control air speed, temperature and/or the time of application of convective heat and control RF energy level, frequency and phase based on recipes, algorithms and/or the like in response to user input at the user interface 340. In some examples, the control electronics 220 may be configured to make adjustments to temperature and/or air speed or make adjustments to RF energy level, phase and/or frequency based on the cooking time, power, and/or recipe selected. Alternatively, the control electronics 220 may be enabled to make adjustments to cooking time based on the adjustment of either or both of the temperature/air speed and energy level/frequency/phase. In some cases, a separate instance of a processor (or processors) and memory may be associated with energy application (perhaps even distinctly separate between the first and second energy sources 200 and 210), and user interface.

In an example embodiment, the control electronics 220 may access instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s) disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process.

Accordingly, for example, the control electronics 220 may be configured to extrapolate, calculate or otherwise determine the amount of energy to be directed into food product so that accurate cooking effects may be anticipated to maximize the quality of cooking. The control electronics 220 may then control operation of the RF generator 204 and/or the antenna assembly 130 based on the static and dynamic inputs provided. Thus, if different food items are located in the cooking chamber 102, the control electronics 220 may direct a desired amount of RF energy to the appropriate respective different food items to achieve the desired cooking results. In other words, the energy application could be provided in a manner that is at least somewhat specific to the food being cooked. Unlike a conventional microwave or combination oven, in which the user essentially selects a power level and time for application of RF energy and the RF energy is thereafter applied indiscriminately for the selected time at the corresponding power level regardless of the food product being cooked, example embodiments employ control over the specific frequencies and phases applied for the user selected power and time requirements based on the food product (or at least the recipe that corresponds to the food product) in the cooking chamber 102. Moreover, example embodiments employ a learning process to determine specific frequency and phase information to employ during the cooking process. The learning process may be executed either at the beginning of the RF application stage during a cooking process or repeatedly during the application of RF energy at various intervals during the cooking process. As such, for example, the user may select a power level and/or time for cooking, and the frequency and phase to be used for the cooking process may be selected automatically based on the employment of selected frequency and phase combinations that are determined by the learning process employed to receive feedback regarding how the specific food product placed in the cooking chamber 102 reacts with or to the RF energy being applied therein.

Furthermore, in some example embodiments, the control electronics 220 may be configured to determine a cooking impact that heat addition associated with convective heating may provide to an already calculated cook time associated with another energy source (e.g., the first energy source 200). Thus, for example, if a cook time is determined for cooking relative to heating applied by the first energy source 200, and adjustments or inputs are made to direct usage of the second energy source 210, the control electronics 220 may be configured to calculate adjustments (and apply such adjustments) to the application of the first energy source 200 in order to ensure that the cooking operation does not overcook or overheat the food product.

As discussed above, in some embodiments, the control electronics 220 may be configured to perform a learning step or process to enable information to be learned about the location and/or absorption characteristics of the food product within the cooking chamber 102. The phase and frequency may then be selected and/or controlled to provide different amounts, frequencies, phases, etc., of RF energy to be directed to different portions of the cooking chamber 102 to correspond to the foods located in the cooking chamber 102. In some embodiments, the control electronics 220 may be configured to adjust calculations regarding the times and/or amounts of RF energy to be applied to achieve a certain level of doneness (e.g., associated with a corresponding amount of energy absorption) based on oven 100 configuration as indicated by the learning process. However, typically, the user will select the time and amount of energy either directly (e.g., by manually entering such parameters) or indirectly (e.g., by selecting a recipe or cooking program that prescribes the time and power level or amount of RF).

In some cases, the processing circuitry 300 may convert user input provided via the user interface 340 into instructions for control of the first and second energy sources 200 and 210 based on stored algorithms or other programs, as described herein. In this regard, for example, the user interface 340 may provide one or more screens or interface consoles that enable inputs to be provided and thereafter processed in corresponding ways that enable the control capabilities of the oven 100 to be optimally employed. These screens or interface consoles may therefore define a workflow that enables unique capabilities for the operation of the oven 100 and user experience in interacting with the oven 100.

FIGS. 4-7 illustrate some examples of specific screens or interface consoles to facilitate discussion of the workflow control and user experience that is achievable using example embodiments. The screens or interface consoles shown in FIGS. 4-7 may be provided at the interface panel 106 via operation of the control electronics 220 (and in particular operations or interactions with or by the user interface 340).

Figure 4:
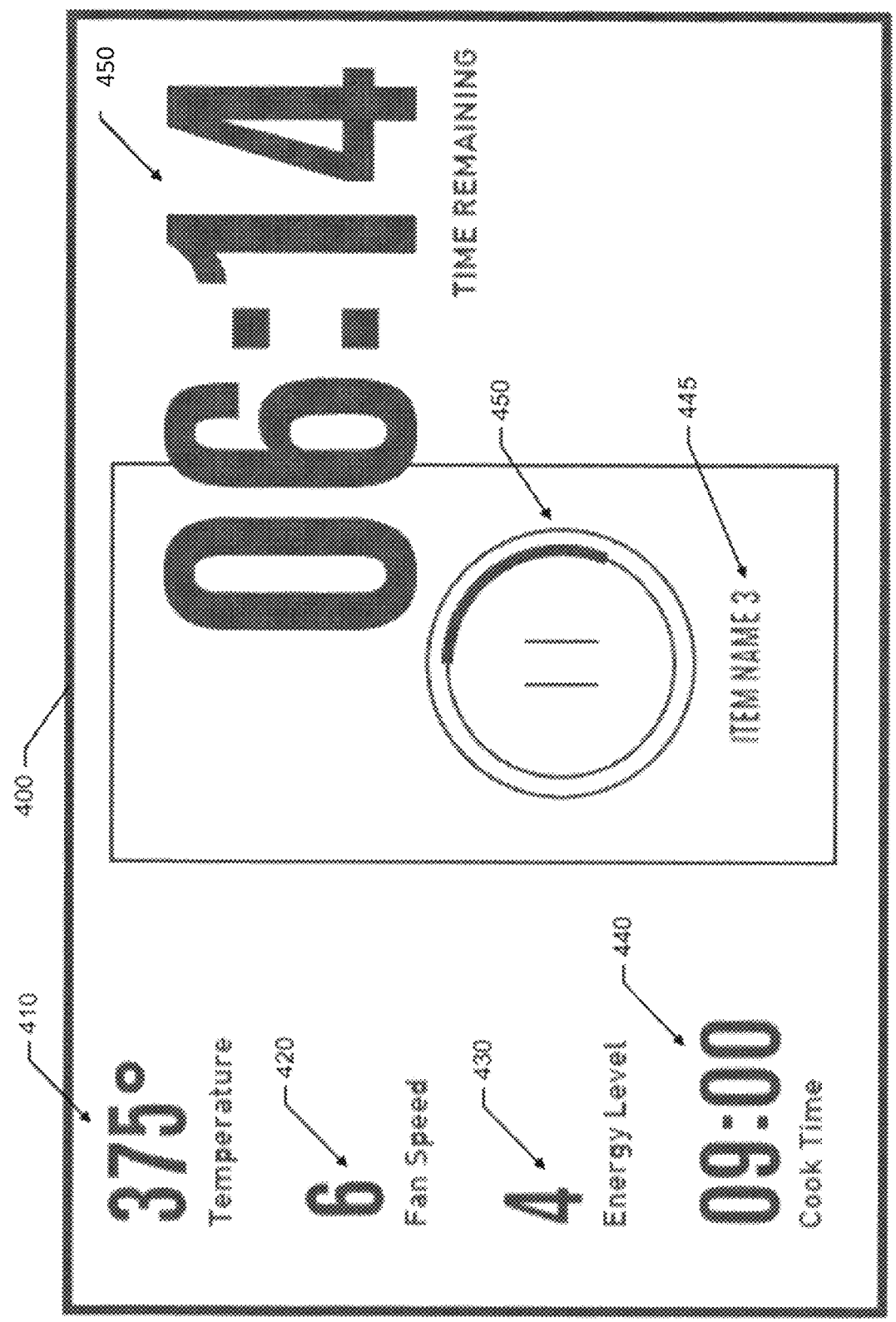
FIG. 4 illustrates a control console that may be displayed during execution of a cooking program according to an example embodiment.

FIG. 4 shows an interface console 400 presented during the process of cooking in accordance with an example embodiment. As shown in FIG. 4, while cooking is in progress, a number of indications regarding the cooking process may be provided. In this regard, for example, an oven temperature indicator 410 may be provided to show the current set temperature of the oven. A fan speed indicator 420 may also be provided to show the current speed of the fan of the airflow generator 212 that is associated with the second energy source 210. An energy level indicator 430 is provided to show the current energy level output of the RF generator 204 into the cooking chamber 102. A cook time indicator 440 is also provided to show the total cook time defined either manually by the user or responsive to user selection of a particular recipe or cooking program. A cooking program (or recipe) indicator 445 may be provided to indicate an item, program or recipe name for the program being executed.

In an example embodiment, the oven temperature indicator 410, the fan speed indicator 420, the energy level indicator 430 and the cook time indicator 440 may be provided along one side of the interface console 400 and some or all of the indicators may be selectable to transition to another interface console associated with making modifications to the corresponding settings associated with such indicators (as will be discussed in greater detail below). The cooking program indicator 445 may be provided adjacent to the oven temperature indicator 410, the fan speed indicator 420, the energy level indicator 430 and the cook time indicator 440 in a separate console or portion of the interface console 400. The cooking program indicator 445 identifies the name (and in some cases also an image) associated with item, program or recipe being executed, or ready to be executed (e.g., selected).

In an example embodiment, a combined progress indicator and control operator 450 may be provided for the item, program or recipe being executed or ready to be executed. The combined progress indicator and control operator 450 provides a single icon or indicator configured to show current progress relative to a representation of a full commitment of time to complete the selected cooking program in combination with a selectable operator for controlling (e.g., starting, stopping, pausing, or the like) progress toward achieving completion of the selected cooking program.

The combined progress indicator and control operator 450 provides for control of function execution based on provision of a graphic representation of the function that is to be performed such that the graphic representation of the function that is to be performed is framed by simultaneous presentations of a fixed representation of the full commitment of time for the cooking program selected and a dynamic representation of the progress toward completion of that full commitment. In other words, a user selectable graphic for control of a function associated with executing a cooking program is surrounded by a non-user selectable (and automatically generated and reconfigured) graphic representation of the progress toward completion of the cooking program.

Figure 5:
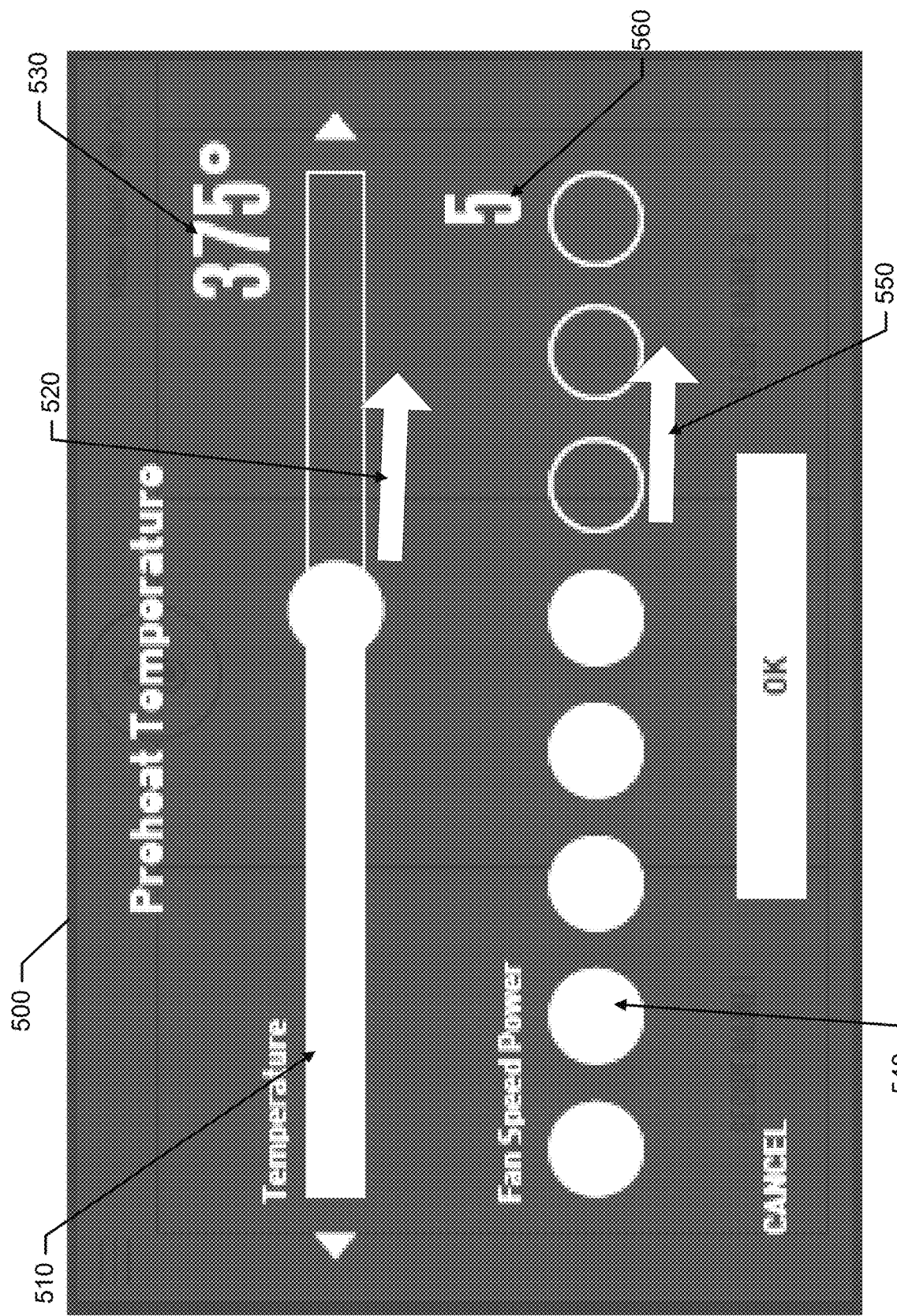
FIG. 5 illustrates a parameter selection screen for defining preheating parameters according to an example embodiment.

FIG. 5 shows an adjustment screen 500 (or an alternative screen similar thereto (e.g., see FIG. 6) could be for adjusting cooking parameters instead of preheat temperature and/or fan speed. However, it should be appreciated that the adjustment screen 500 could include just a single parameter or additional parameters in alternative embodiments. Moreover, the adjustment screen 500 (or an alternative screen similar thereto (e.g., see FIG. 6) could be for adjusting cooking parameters instead of preheating parameters. Thus, for example, any indicator shown in FIG. 4 could be selected to adjust the corresponding parameter indicated by the indicator. Selection of the indicator may then launch the adjustment screen 500 of FIG. 5.

Generally speaking, the adjustment screen 500 may include slidable indicators for adjusting corresponding parameters. In the example of FIG. 5, a temperature adjuster 510 is provided and can be slid in the direction of arrow 520 to increase temperature, or in the opposite direction to reduce temperature. The current setting 530 is shown proximate to the temperature adjuster 510. Similarly, a speed adjuster 540 is provided and can be slid in the direction of arrow 550 to increase fan speed, or in the opposite direction to reduce fan speed. The current setting 560 is shown proximate to the speed adjuster 540.

When a cooking program (such as the one shown in FIG. 4) is adjusted, the adjustment may be saved as an update to the cooking program, or as a new cooking program. In either case, if the user selects the cooking program or new cooking program, the control circuitry 220 may operate oven components to increase the temperature and fan speed in the manner directed by the cooking program, but also dictate the energy level and cooking time for application of RF energy according to the cooking program responsive to performing the learning process described above to determine the frequency and phase of the RF energy applied. As such, in examples where the cooking program is executed, the RF energy or power level and the cooking time are indirectly selected by the user. However, the oven 100 can also be operated to directly select such parameters.

Figure 6:
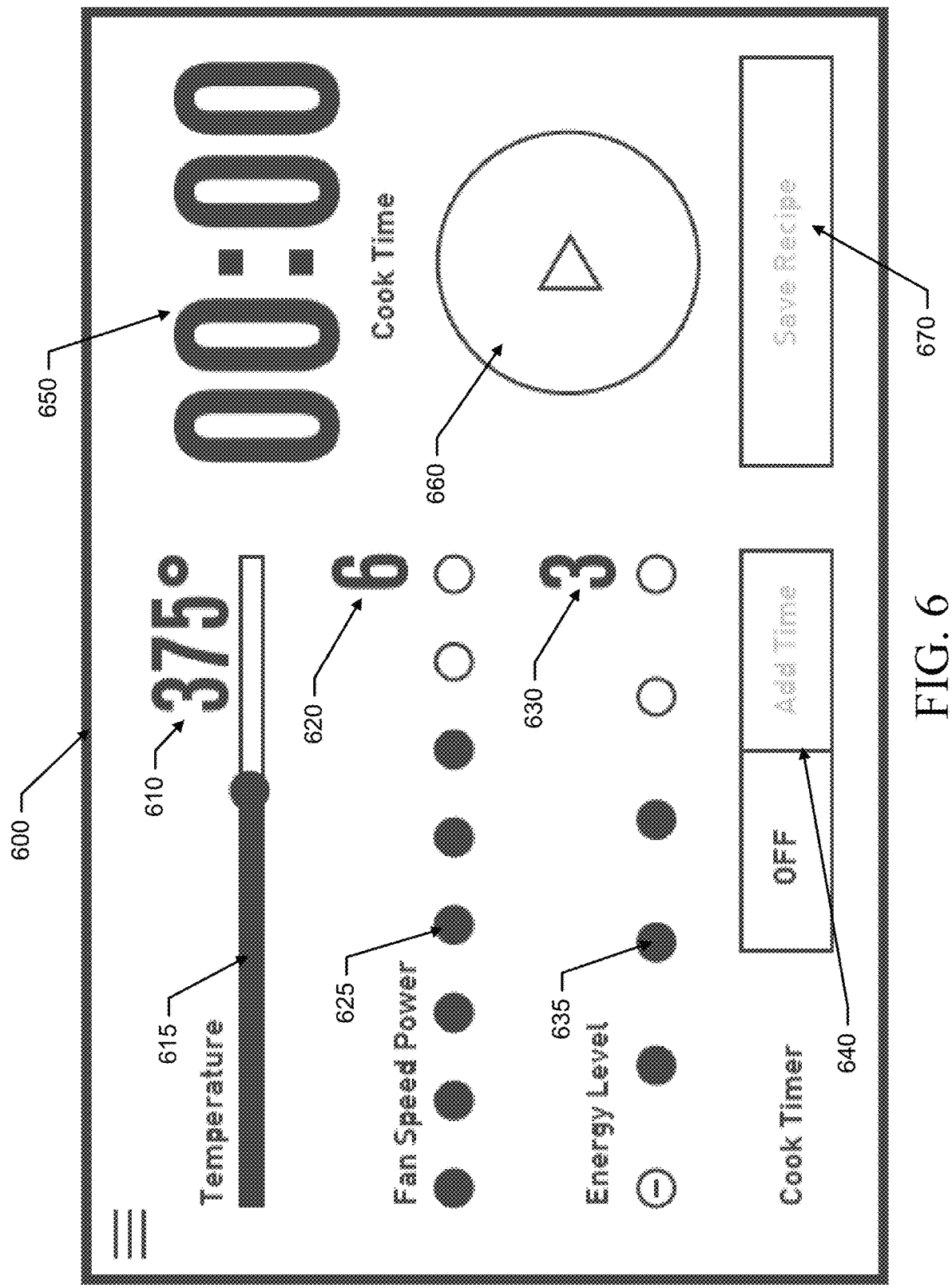
FIG. 6 illustrates a parameter selection screen for defining a cooking operation that can be saved as a recipe according to an example embodiment.

FIG. 6 illustrates an example interface console 600 for manual entry of cooking parameters that may define a recipe (e.g., a cooking program), or may simply be executed without storage as a cooking program as a stand-alone cooking operation. Referring to FIG. 6, the operator may select a cooking temperature 610 from a temperature selector 615 and a fan speed 620 via a fan speed selector 625. These selections provide instructions for the operation of the second energy source 210 during execution of the cooking operation (e.g., during timer countdown).

The energy level 630 is selected via an energy level selector 635 to define the power level for RF generation by the RF generator 204. The cook timer 640 allows the user to select a time duration for the application of cooking energy during execution of the cooking operation via the first and/or second energy sources 200 and 210. When the time duration has been defined, it may be displayed by timer 650. After all the above listed parameters are defined, the defined parameters can be executed for a cooking operation without saving as a cooking program by selection of the execution operator 660. However, if the user would prefer to save the defined parameters as a cooking program, the user may select a save recipe operator 670 to save the defined parameters.

Figure 7:
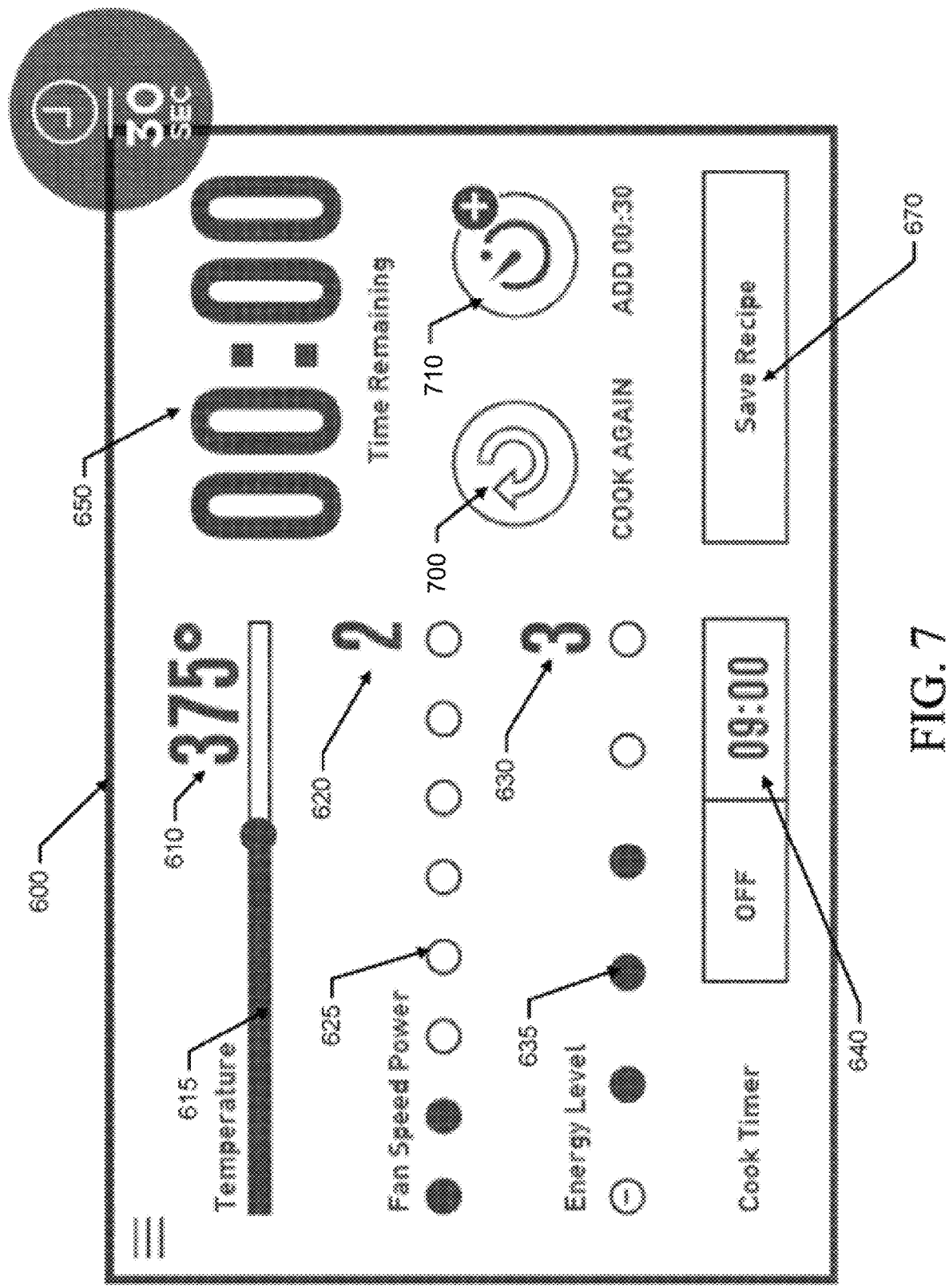
FIG. 7 illustrates the parameter selection screen after execution of the cooking operation according to an example embodiment.

In situations where the cooking operation is initially executed without saving by selection of the execution operator 660 and the cooking operation proceeds to completion, the user may be provided with the option to repeat the cooking operation (again without saving) by selecting a repeat option 700, as shown in FIG. 7. Alternatively, the user may opt to add additional time to the cooking operation by selecting the add time option 710. The user may also elect to save the defined parameters as a cooking program by selection of the save recipe operator 670.

As discussed above, a learning process may initially be employed to automatically select frequency and phase parameters to be employed at the selected power level during the time defined for cooking. FIG. 8 illustrates a plot showing the application of RF energy during the cooking time ($t_F$). In this regard, the power level of the RF energy is initially zero. Then, at time t=0 the learning process 800 begins. During the learning process 800, a plurality of frequencies, within a frequency band, are generated for provision into the cooking chamber 102. For example, if the frequencies are ISM band frequencies around 2.41 to 2.49 GHz, the control electronics 220 may generate eleven different frequencies (e.g., 2.41, 2.42, . . . , 2.49 GHz) for provision into the cooking chamber 102 and efficiency measurements may be made at each frequency to determine which frequencies have the highest efficiency as indicated by having a low reflected power and maximum power delivery to the food item (e.g., absorption). In some cases, a change in maximum and minimum efficiency may be calculated for each frequency, and the frequency or frequencies that exhibit the smallest difference between the maximum and minimum changes in efficiency may be selected from the learning process 800. The learning process 800 continues until the end of the learning at time $t_L$. However, other strategies may also be employed in alternative embodiments.

After the learning process 800 is complete. The cooking process 810 may be applied with the frequency or frequencies selected from the learning process. Thus, the learning process 800 may sometimes be performed with more frequencies (and at lower power in some cases) than the cooking process 810. The cooking process 810 occurs at the power selected by the user, but at frequencies selected during the learning process 800. The frequency or frequencies selected from the learning process 800 may define modes or maxima within the space defined in the cooking chamber 102, and the maxima may otherwise be areas of higher density of application of heat using RF energy. Phase changes may then be applied to perform electronic stirring within the cooking chamber 102 in order to improve uniformity in the heating process. Various strategies may be employed to determine how to apply the phase changes.

In an example embodiment, the learning process is executed each time a cooking program is executed, or each time a particular cooking operation is executed. Moreover, in some cases, each of the instances in which the learning process is run is completely independent of any prior learning processes. Thus, the learning performed for one execution of a recipe does not necessarily mean that identical (or even similar) results will be achieved the next time the same recipe is executed. As such, even for repeatable cooking processes or programs, the frequency and the phase parameters determined responsive to learning may be automatically selected separately each time the cooking processes or programs are repeated such that a set of first selected frequency and phase parameters for a first instance of the learning process may be different than a set of second selected frequency and phase parameters associated with a second instance of the learning process for execution within a single cooking program or a subsequent instance of execution of the cooking program.

FIG. 9 illustrates an example of a cooking program with multiple learning processes performed therein. Multiple instances of the learning process may be desirable when, for example, the nature or character of the food changes during the cooking process. For example, if the contents rise substantially, or change in density or texture, the absorption of frequencies may be affected such that a new learning process may be advantageous to perform. In the example of FIG. 9, a first learning process 900 is initially performed and then a first cooking process 910 is performed base on the first learning process 900. Thus, frequencies selected responsive to the first learning process 900 may be employed with phase change strategies for electronic stirring until a first repeat learning process (or merely a second learning process 920) is performed. A second cooking process 930 may then be executed based on the second learning process 920. This process may be repeated any number of times, although FIG. 9 merely shows another repeat learning process (e.g., a third learning process 940) and corresponding third cooking process 950.

In an example embodiment, an oven may be provided. The oven may include a cooking chamber configured to receive a food product, a convective heating system configured to provide heated air into the cooking chamber, a radio frequency (RF) heating system configured to provide RF energy into the cooking chamber using solid state electronic components, and control electronics configured to control the convective heating system and the RF heating system. The control electronics may further control a user interface configured to define one or more control consoles for providing user inputs to control operation of the oven. The control electronics are configured to enable user selection of a cooking time and a selected RF cooking power, but automatic selection of frequency and phase parameters for application of the RF energy responsive to a learning process.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, the learning process may include providing a plurality of frequencies within a frequency band into the cooking chamber while an object to be heated is located therein, and selecting a subset of the frequencies based on an efficiency measure relative to absorption of individual ones of the frequencies. In some cases, the learning process may be performed over the plurality of frequencies at a power lower than the selected RF cooking power prior to application of the RF cooking power at only the subset of frequencies. In an example embodiment, the subset of frequencies may be a first subset, and the learning process may be repeated at least once to define at least a second subset of frequencies. In some examples, the user manually selects the cooking time and the selected RF cooking power. In such a case, cooking chamber temperature and fan speed for the convective heating system may also be defined manually by the user. Alternatively or additionally, the user may select the cooking time and the selected RF cooking power by selecting a cooking program or recipe defining the cooking time and the selected RF cooking power. In such a case, the cooking chamber temperature and fan speed for the convective heating system may also be defined by selecting the cooking program. In an example embodiment, the user interface further enables additional time to be added to the cooking time, and responsive to adding the additional time, a second learning process may be initiated. In some cases, the user interface may be configured to enable definition of one or more cooking programs that are repeatable by user selection, and the frequency and the phase parameters may be automatically selected separately responsive to corresponding operation of the learning process each time the one or more cooking programs are repeatable such that first selected frequency and phase parameters for a first instance of the learning process are different than second selected frequency and phase parameters associated with a second instance of the learning process for execution of one cooking program.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:
1. An oven comprising:
a cooking chamber configured to receive a food product;
a convective heating system configured to provide heated air into the cooking chamber;
a radio frequency (RF) heating system configured to provide RF energy into the cooking chamber using solid state electronic components; and
control electronics configured to control the convective heating system and the RF heating system, the control electronics further controlling a user interface configured to define one or more control consoles for providing user inputs to control operation of the oven,
wherein the control electronics are configured to enable user selection of a cooking time and a selected RF cooking power, but automatic selection of frequency and phase parameters for application of the RF energy responsive to a learning process.

2. The oven of claim 1, wherein the learning process comprises:
providing a plurality of frequencies within a frequency band into the cooking chamber while an object to be heated is located therein, and
selecting a subset of the frequencies based on an efficiency measure relative to absorption of individual ones of the frequencies.

3. The oven of claim 2, wherein the learning process is performed over the plurality of frequencies at a power lower than the selected RF cooking power prior to application of the RF cooking power at only the subset of frequencies.

4. The oven of claim 3, wherein the subset of frequencies is a first subset, and
wherein the learning process is repeated at least once to define at least a second subset of frequencies.

5. The oven of claim 1, wherein the cooking time and the selected RF cooking power are manually selectable by the user.

6. The oven of claim 5, wherein cooking chamber temperature and fan speed for the convective heating system are also defined manually by the user.

7. The oven of claim 1, wherein the user selects the cooking time and the selected RF cooking power by selecting a cooking program or recipe defining the cooking time and the selected RF cooking power.

8. The oven of claim 7, wherein cooking chamber temperature and fan speed for the convective heating system are also defined by selecting the cooking program.

9. The oven of claim 1, wherein the user interface further enables additional time to be added to the cooking time, and wherein responsive to adding the additional time, a second learning process is initiated.

10. The oven of claim 1, wherein the user interface is configured to enable definition of one or more cooking programs that are repeatable by user selection, and wherein the frequency and the phase parameters are automatically selected separately responsive to corresponding operation of the learning process each time the one or more cooking programs are repeatable such that first selected frequency and phase parameters for a first instance of the learning process are different than second selected frequency and phase parameters associated with a second instance of the learning process for execution of one cooking program.

11. Control electronics comprising a user interface, the control electronics being further configured to control a radio frequency (RF) heating system configured to provide RF energy into a cooking chamber of an oven using solid state electronic components,
wherein the control electronics are configured to define one or more control consoles, at least one of the control consoles enabling a user to select a cooking program for execution to cooking a food product in the cooking chamber via the RF heating system, wherein the control electronics are configured to enable user selection of a cooking time and a selected RF cooking power, but automatic selection of frequency and phase parameters for application of the RF energy responsive to a learning process.

12. The control electronics of claim 11, wherein the learning process comprises:
   providing a plurality of frequencies within a frequency band into the cooking chamber while an object to be heated is located therein, and
   selecting a subset of the frequencies based on an efficiency measure relative to absorption of individual ones of the frequencies.

13. The control electronics of claim 12, wherein the learning process is performed over the plurality of frequencies at a power lower than the selected RF cooking power prior to application of the RF cooking power at only the subset of frequencies.

14. The control electronics of claim 13, wherein the subset of frequencies is a first subset, and
   wherein the learning process is repeated at least once to define at least a second subset of frequencies.

15. The control electronics of claim 11, wherein the cooking time and the selected RF cooking power are manually selectable by the user.

16. The control electronics of claim 15, wherein cooking chamber temperature and fan speed for the convective heating system are also defined manually by the user.

17. The control electronics of claim 11, wherein the user selects the cooking time and the selected RF cooking power by selecting a cooking program or recipe defining the cooking time and the selected RF cooking power.

18. The control electronics of claim 17, wherein cooking chamber temperature and fan speed for the convective heating system are also defined by selecting the cooking program.

19. The control electronics of claim 11, wherein the user interface further enables additional time to be added to the cooking time, and wherein responsive to adding the additional time, a second learning process is initiated.

20. Control electronics comprising a user interface, the control electronics being further configured to control a radio frequency (RF) heating system configured to provide RF energy into a cooking chamber of an oven using solid state electronic components, wherein the control electronics are configured to define one or more control consoles, at least one of the control consoles enabling a user to select a cooking program for execution to cooking a food product in the cooking chamber via the RF heating system, wherein the control electronics are configured to enable user selection of a cooking time and a selected RF cooking power, but automatic selection of frequency and phase parameters for application of the RF energy responsive to a learning process, wherein the user interface is configured to enable definition of one or more cooking programs that are repeatable by user selection, and wherein the frequency and the phase parameters are automatically selected separately responsive to corresponding operation of the learning process each time the one or more cooking programs are repeatable such that first selected frequency and phase parameters for a first instance of the learning process are different than second selected frequency and phase parameters associated with a second instance of the learning process for execution of one cooking program.

* * * * *